(12) United States Patent
Schmitz et al.

(10) Patent No.: US 6,638,332 B1
(45) Date of Patent: Oct. 28, 2003

(54) FILTER WITH MULTI-PURPOSE END CAP

(75) Inventors: Kelly R. Schmitz, Stoughton, WI (US); Jon S. Wake, Verona, WI (US)

(73) Assignee: FleetGuard, Inc., Nashville, TN (US)

( * ) Notice: Subject to any disclaimer, the term of this patent is extended or adjusted under 35 U.S.C. 154(b) by 0 days.

(21) Appl. No.: 10/002,655

(22) Filed: Oct. 31, 2001

(51) Int. Cl.⁷ .............................................. B01D 46/10
(52) U.S. Cl. ............................. 55/392; 55/498; 55/502; 210/450; 210/493.2
(58) Field of Search .................. 55/392, 498, 502; 210/450, 493.2

(56) References Cited

U.S. PATENT DOCUMENTS

| | | | |
|---|---|---|---|
| 4,283,289 A | * | 8/1981 | Meyst et al. ................. 210/448 |
| 5,106,397 A | | 4/1992 | Jaroszczyk et al. |
| 5,167,683 A | | 12/1992 | Behrendt et al. |
| 5,468,384 A | * | 11/1995 | Garcera et al. ............. 210/232 |
| 5,484,466 A | | 1/1996 | Brown et al. |
| 5,545,242 A | * | 8/1996 | Whitlock et al. ............. 55/502 |
| 5,605,625 A | | 2/1997 | Mills |
| 5,725,624 A | | 3/1998 | Ernst et al. |
| 5,893,937 A | | 4/1999 | Moessinger |
| 6,024,229 A | * | 2/2000 | Ayers ......................... 210/443 |
| 6,258,145 B1 | | 7/2001 | Engel et al. |
| 6,261,334 B1 | | 7/2001 | Morgan et al. |
| 6,383,244 B1 | * | 5/2002 | Wake et al. .................. 55/482 |
| 6,436,162 B1 | * | 8/2002 | Wake et al. .................. 55/498 |
| 6,537,339 B2 | * | 3/2003 | Schmitz et al. ............... 55/498 |

FOREIGN PATENT DOCUMENTS

GB 2110110 6/1983

* cited by examiner

*Primary Examiner*—Frank M. Lawrence
(74) *Attorney, Agent, or Firm*—Andrus, Sceales, Starke & Sawall, LLP

(57) ABSTRACT

A filter (10), including an inside-out reverse flow air filter, has an annular filter element (20) with an upper end cap (24) provided by a resiliently compressible trifunctional member having: (a) a wall (50) deflecting debris radially outwardly within the housing away from the central opening (26) of the hollow filter interior (22); (b) an air entrance guide throat (52) directing air to the central opening (26) with reduced restriction; and (c) a sealing surface (54) sealed to the housing and blocking air flow from the inlet (28) to the outlet (34) otherwise bypassing the filter element. In further embodiments, simplified and cost reduced sealing is provided by a configured end cap.

12 Claims, 2 Drawing Sheets

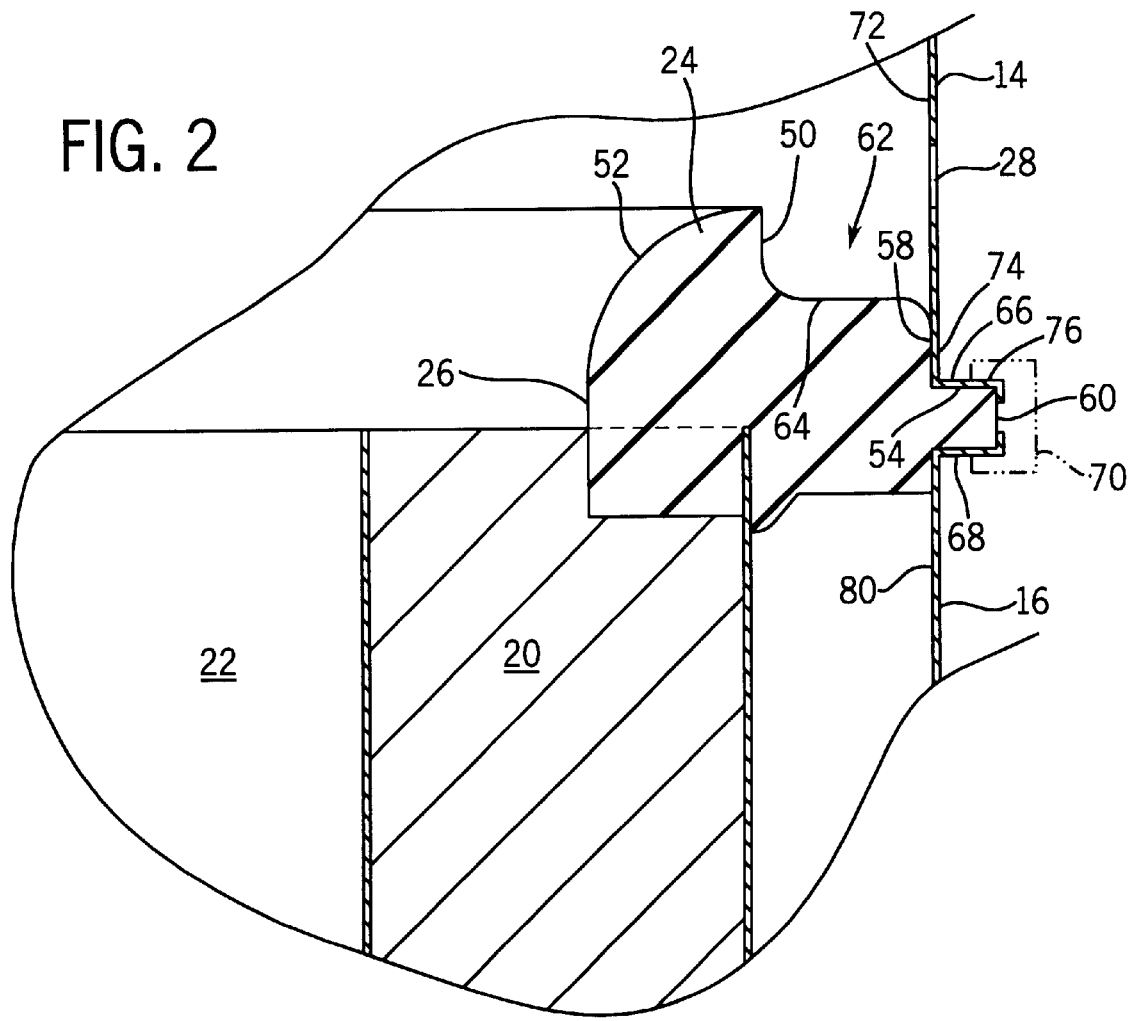

FILTER WITH MULTI-PURPOSE END CAP

BACKGROUND AND SUMMARY OF THE INVENTION

The invention relates to filters, including inside-out reverse flow air filters, and more particularly to a multi-purpose filter end cap providing simplicity and cost reduction.

The invention arose during development efforts relating to inside-out reverse flow air filters, for example commonly found as exterior canister air filters on over-the-road trucks. These air cleaners are under constant scrutiny by customers for cost reduction. Prior designs have a housing with a main body holding a filter element and closed by a cover. The cover has a plurality of perforations providing an inlet through which incoming air flows. The cover also has a venturi-like air entrance guide throat partially inserted into the hollow open interior of the filter element for directing the incoming air thereinto. The exterior of such throat provides a wall deflecting debris away from the central opening and radially outwardly within the cover where it can be ejected out the other side of the perforated cover. One or more gaskets are used to seal the cover and throat to the main body.

The present invention provides the above noted desired cost reduction in the noted inside-out reverse flow air filter, while maintaining desirable aspects of: (a) a wall deflecting debris radially outwardly within the housing cover away from the central opening; (b) an air entrance guide throat directing air to the central opening with reduced restriction; and (c) a sealing surface sealing the filter element to -the housing and blocking air flow from the inlet to the outlet otherwise bypassing the filter element. These aspects together with cost reduction are provided by a multi-functional upper end cap for the filter element. The invention further has use in numerous filter sealing arrangements.

BRIEF DESCRIPTION OF THE DRAWINGS

FIG. 2 is an enlarged view of a portion of FIG. 1.

DETAILED DESCRIPTION

Figure 1:
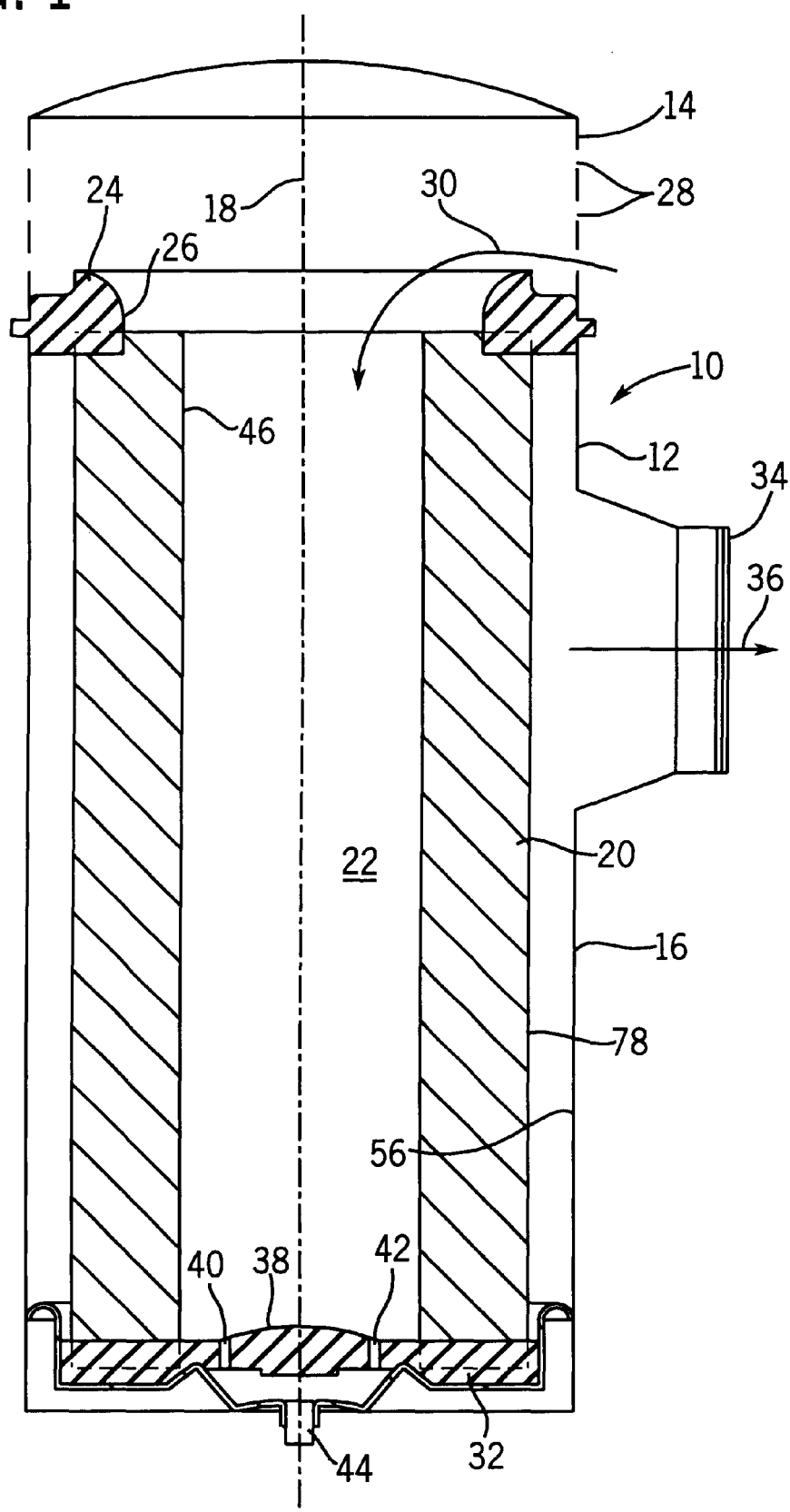
FIG. 1 is a side view partially in section of a filter in accordance with the invention.

FIG. 1 shows an inside-out reverse flow air filter 10 including a housing 12 with a first section or cover 14 mounted to and closing a second section or main body 16. The housing extends axially along a vertical axis 18. An annular pleated filter element 20 has a hollow interior 22 and extends axially along axis 18. An annular upper end cap 24 has a central opening 26 for receiving incoming air flow axially downwardly into hollow interior 22 from an air inlet in cover 14 provided by a plurality of perforations 28 therethrough. The incoming air flow is shown at arrow 30. A closed lower end cap 32 spans hollow interior 22, such that air in hollow interior 22 flows radially outwardly through annular filter element 20 to outlet 34 in main body 16. The outgoing air flow is shown at arrow 36. End caps 24 and 32 are resiliently compressible molded urethane. Lower end cap 32 may have molded drainage surfaces, including a raised central dome 38 shedding moisture radially outwardly and downwardly from axis 18 to a plurality of drainage holes such as 40, 42 spaced radially outwardly of central axis 18 and below the top of dome 38, which moisture may be expelled or drained at discharge valve or plug 44, for example as in commonly owned co-pending U.S. patent application Ser. No. 09/849,204, filed May 4, 2001, now U.S. Pat. No. 6,537,339, incorporated herein by reference. Upper end cap 24 may extend radially inwardly to inner perimeter 46 of annular filter element 20, or may extend only partially across the top axial end of the annulus of the filter element as shown in FIG. 1 and have alternately sealed pleats as in U.S. Pat. No. 6,261,334, incorporated herein by reference.

Upper end cap 24 is a molded urethane resiliently compressible trifunctional member having: (a) a wall 50, FIG. 2, deflecting debris radially outwardly within the housing away from central opening 26; (b) an air entrance guide throat 52 directing air to central opening 26 with reduced restriction; and (c) a sealing surface 54 sealed to the housing and blocking air flow from inlet 28 to outlet 34 otherwise bypassing filter element 20. Housing 12 has a cylindrical sidewall 56. End cap 24 has an inner diameter at 26 with a tapered surface at 52 providing the noted air entrance guide throat. End cap 24 has first, second and third outer diameters at 50, 58, 60 defining: a first annular surface at 50 facing radially outwardly at the first outer diameter and spaced radially inwardly of the cylindrical sidewall of the housing by a radial gap 62 therebetween; a second annular surface 64 facing axially upwardly away from end cap 32 and spanning between the noted first and second outer diameters 50 and 58 and extending radially in gap 62; a third annular surface at 58 facing radially outwardly at the noted second outer diameter; and a fourth annular surface at 54 facing axially upwardly away from end cap 32 and spanning between the noted second and third outer diameters 58 and 60. End cap axially compressed in sealing engagement in the housing at the noted fourth annular surface 54, to provide the noted sealing surface. The noted first annular surface 50 provides the noted deflecting wall. Debris is deflected by such wall into radial gap 62 above second annular surface 64 between first annular surface 50 and the cylindrical sidewall of the housing. End cap 24 is radially inwardly compressed at second outer diameter 58 when cover 14 is inserted axially downwardly onto the end cap, such that second outer diameter 58 of end cap 24 in the housing is equal to the diameter of the noted cylindrical sidewall of the housing, and the noted sealing surface is additionally provided by a radial seal at third annular surface 58. Third outer diameter 60 of end cap 24 in the housing is larger than the diameter of the noted cylindrical sidewall of the housing. The housing sections provided by cover 14 and main body 16 have coaxially aligned mating flanges 66 and 68 axially compressing end cap 24 therebetween at fourth annular surface 54, for example as held by a clip or clamp 70 or the like. Cover 14 has a cylindrical sidewall 72 forming part of the noted cylindrical sidewall of the housing and terminating at flange 66 in an L-shape having an axially extending leg 74 and a radially extending leg 76. Axially extending leg 74 engages third annular surface 58 of end cap 24 and forms the noted radial seal therewith. Radially extending leg 76 engages fourth annular surface 54 of end cap 24 and forms the noted axial seal therewith. Outermost outer diameter 60 is greater than the diameter of cylindrical sidewall 56 of the housing. Secondary outer diameter 58 is less than outermost outer diameter 60 and greater than the outer diameter of annular filter element 20 at its outer perimeter 78. Outermost axially facing annular surface 54 extends radially between outermost outer diameter 60 and secondary outer diameter 58 and provides an axial seal in the housing. Secondary axially facing annular surface 64 extends radially inwardly from secondary outer diameter 58. Main body 16 of the housing has a cylindrical sidewall 80 forming part of the noted cylindrical sidewall of the housing and terminating at flange 68 in an L-shape having axial and radial legs, as above, engaging end cap 24 and providing respective radial and axial seals therewith.

It is recognized that various equivalents, alternatives and modifications are possible within the scope of the appended claims which distinctly define the subject matter regarded as the invention.

What is claimed is:

1. A fluid filter comprising a housing having a cylindrical sidewall and extending axially along an axis, an annular filter element having a hollow interior and extending axially in said housing between first and second distally opposite axial ends, first and second end caps at said first and second axial ends, respectively, said first end cap being resiliently compressible and having a plurality of outer diameters comprising an outermost outer diameter greater than the diameter of said cylindrical sidewall of said housing, and a secondary outer diameter less than said outermost outer diameter and greater than the outer diameter of said annular filter element, said first end cap having an outermost axially facing annular surface extending radially between said outermost outer diameter and said secondary outer diameter and providing an axial seal in said housing, and a secondary axially facing annular surface extending radially inwardly from said secondary outer diameter, wherein said annular filter element is spaced radially inwardly of said cylindrical sidewall of said housing by a gap therebetween, and said secondary annular surface extends radially in said gap and wherein each of said outermost and secondary annular surfaces faces axially away from said second end cap.

2. A fluid filter comprising a housing having a cylindrical sidewall and extending axially along an axis, an annular filter element having a hollow interior and extending axially in said housing between first and second distally opposite axial ends, first and second end caps at said first and second axial ends, respectively, said first end cap being resiliently compressible and having first, second and third outer diameters defining a first annular surface facing radially outwardly at said first outer diameter and spaced radially inwardly of said cylindrical sidewall of said housing by a radial gap therebetween, a second annular surface facing axially and spanning between said first and second outer diameters and extending radially in said gap, a third annular surface facing radially outwardly at said second outer diameter, a fourth annular surface facing axially and spanning between said second and third outer diameters, said first end cap being axially compressed in sealing engagement in said housing at said fourth annular surface.

3. The filter according to claim 2 wherein said third outer diameter of said first end cap in said housing is larger than the diameter of said cylindrical sidewall of said housing.

4. The filter according to claim 3 wherein said second outer diameter of said first end cap in said housing is equal to the diameter of said cylindrical sidewall of said housing.

5. The filter according to claim 2 wherein said housing comprises a first section having a port therethrough communicating with said hollow interior of said filter element, and a second section having a port therethrough communicating with said filter element on the opposite side thereof from said hollow interior, wherein fluid flows through said filter element between said ports, said first and second sections having coaxially aligned mating flanges axially compressing said first end cap therebetween at said fourth annular surface.

6. The filter according to claim 5 wherein said first section of said housing has a cylindrical sidewall forming part of said cylindrical sidewall of said housing, said sidewall of said first section terminates at said flange of said first section in an L-shape having an axially extending leg and a radially extending leg, said axially extending leg engaging said third annular surface of said first end cap and forming a radial seal therewith, said radially extending leg engaging said fourth annular surface of said first end cap and forming an axial seal therewith.

7. The filter according to claim 2 wherein each of said second and fourth annular surfaces faces axially away from said second end cap.

8. An inside-out reverse flow air filter comprising:
a housing having an inlet and an outlet and extending axially along a vertical axis;
an annular filter element having a hollow interior and extending axially along said axis;
an annular upper end cap having a central opening for receiving incoming air flow axially downwardly into said hollow interior from said inlet;
a closed lower end cap spanning said hollow interior, such that air in said hollow interior flows radially outwardly through said annular filter element to said outlet;
said upper end cap being a resiliently compressible trifunctional member having: (a) a wall deflecting debris radially outwardly within said housing away from said central opening; (b) an air entrance guide throat directing air to said central opening with reduced restriction; and (c) a sealing surface sealed to said housing and blocking air flow from said inlet to said outlet otherwise bypassing said filter element.

9. The air filter according to claim 8 wherein said housing has a cylindrical sidewall, said first end cap has an inner diameter with a tapered surface providing said air entrance guide throat, and first, second and third outer diameters defining a first annular surface facing radially outwardly at said first outer diameter and spaced radially inwardly of said cylindrical sidewall of said housing by a radial gap therebetween, a second annular surface facing axially away from said second end cap and spanning between said first and second outer diameters and extending radially in said gap, a third annular surface facing radially outwardly at said second outer diameter, a fourth annular surface facing axially and spanning between said second and third outer diameters, said first end cap being axially compressed in sealing engagement in said housing at said fourth annular surface, said first annular surface providing said deflecting wall, said fourth annular surface providing said sealing surface.

10. The air filter according to claim 9 wherein said second outer diameter of said first end cap in said housing is equal to the diameter of said cylindrical sidewall of said housing, and wherein said sealing surface is additionally provided by said third annular surface.

11. The air filter according to claim 9 wherein said third outer diameter of said first end cap in said housing is larger than the diameter of said cylindrical sidewall of said housing.

12. The air filter according to claim 9 wherein said debris is deflected by said wall provided by said first annular surface into said radial gap above said second annular surface and between said first annular surface and said cylindrical sidewall of said housing.

* * * * *